Nov. 22, 1938. W. J. NIGHTINGALE 2,137,980
AUTOMOBILE DECKING DEVICE
Filed Dec. 20, 1934

INVENTOR
William J. Nightingale
BY
ATTORNEYS

Patented Nov. 22, 1938

2,137,980

UNITED STATES PATENT OFFICE 2,137,980

AUTOMOBILE DECKING DEVICE

William J. Nightingale, Flint, Mich., assignor to Carl W. Bonbright as trustee, Flint, Mich.

Application December 20, 1934, Serial No. 758,377

19 Claims. (Cl. 105—368)

The present invention relates to decking devices for supporting automobiles and like vehicles in freight cars or other transporting vehicles.

The primary object of the present invention is to provide means for supporting an automobile in an inclined position above the floor of a transporting vehicle, which means may be moved into close proximity to the ceiling of the transporting vehicle after the automobile has been removed therefrom in order that the transporting vehicle may be used for shipping other merchandise without the necessity of removing the decking device. More particularly, it is the object of the present invention to provide a decking device and means for securing one end thereof pivotally to a wall of a transporting vehicle and cables associated therewith so that when the cables are shortened the decking device automatically assumes an inclined position with one end attached to the wall of the transporting vehicle. The means which holds the decking device to the wall of the transporting vehicle functions to automatically release that end when a predetermined angularity of the decking device is attained, at which time further shortening of the cables moves the device into close proximity to the ceiling. The degree of angularity required to release the means which ties the decking device to the wall of the transporting vehicle is greater than the degree of angularity at which the device functions to support the automobile and therefore it is impossible to release such means when an automobile is mounted thereon.

With the above and other ends in view the invention consists in matters hereinafter set forth and more particularly pointed out with reference to the accompanying drawing, in which Figure 1 is a side elevation of the present decking device assembled in a freight car;

Like characters of reference are employed throughout to designate corresponding parts.

Figure 1:
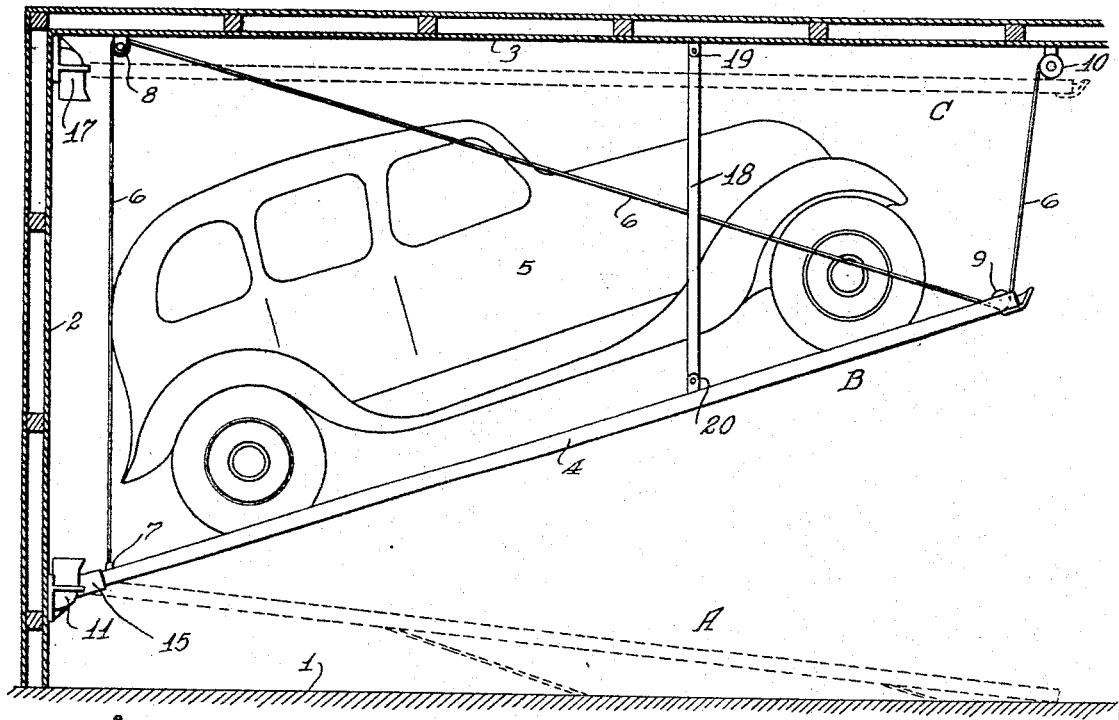
Figures 2, 3, 4:
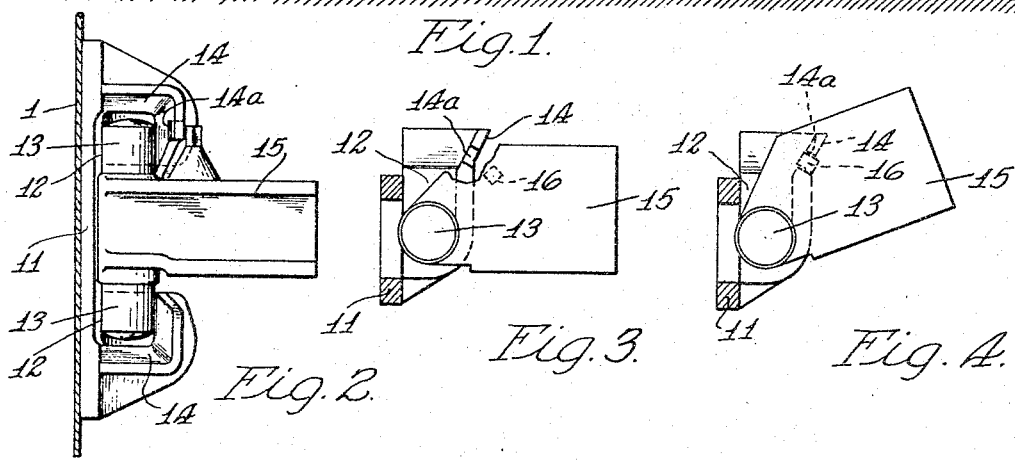
Fig. 2 is a top plan of one of the means for attaching the decking device to the wall of the freight car.
Fig. 3 is a cross section of the means shown in Fig. 2.
Fig. 4 is a view similar to Fig. 3 and illustrating another position of the mechanism.
Figures 5, 6:
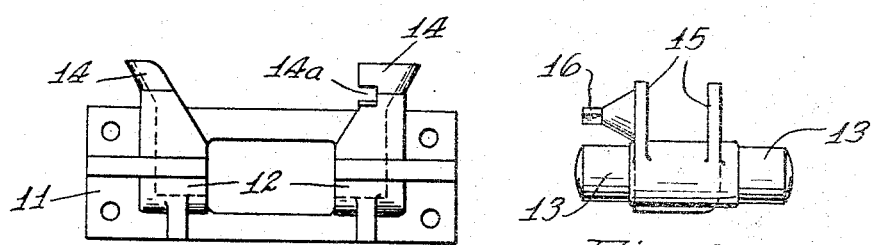
Fig. 5 is an elevation of one of the brackets which are permanently attached to a wall of the freight car.
Fig. 6 is an end elevation of one of the securing elements that are carried by the decking device.

In Fig. 1 the numeral 1 designates the floor of a freight car, 2 a vertically extending end wall and 3 the roof or ceiling. In the freight car is provided a decking device comprising a platform 4 suitable for receiving and supporting an automobile 5. The platform has a cable 6 secured thereto as at 7, the cable extending upwardly and over a sheave 8 which is secured to the ceiling 3. On the opposite end of the platform, as compared with the attachment 7, is provided a sheave 9 and the cable 6, after being passed over the sheave 8, is trained under the sheave 9 and then extends upwardly to a winding element 10. Any well known suitable means, such as a chain fall, for example, may be employed to rotate the winding element 10 and thus lengthen or shorten the cable 6.

The cable 6, attachment 7 and sheaves 8 and 9 are duplicated on each side of the platform 4, thus providing two separate cables. Both cables are connected to a common winding element 10 so that when they are lengthened or shortened by rotation thereof the platform 4 is caused to be raised or lowered by such shortening or lengthening of the cables.

Secured to the end wall 2 of the freight car is a pair of brackets, one of the brackets being illustrated and designated generally by the numeral 11. It will be understood that the brackets 11 are spaced apart a distance corresponding to the width of the platform 4 and, as illustrated being spaced upwardly a short distance above the floor 1. Each bracket 11 has a pair of horizontally aligned sockets 12 for receiving studs 13 on a block 15 which is secured to the end of the platform 4, it being understood that one of such blocks 15 is secured to the end of platform 4 adjacent to each side thereof to cooperate respectively with the pair of brackets 11. The studs 13 and sockets 12 provide a fulcrum around which the entire platform 4 may pivot in the nature of a common lever.

The sockets 12 are provided with outwardly flared walls 14 and one of the walls 14 is provided with an arcuate notch 14a for receiving a lug 16 which projects outwardly from the side of the block 14.

When the cables 6 are lengthened by unwinding them from the element 10 the platform 4 pivots on its above described fulcrum until the outer end thereof rests on the floor and it thus assumes the position shown in dotted lines and indicated at A in Fig. 1. The automobile 5 is then driven or pushed onto the platform 4 and is secured thereon by any suitable tie-down means known in the art, and inasmuch as such tie-down means are well known in the art the same has not been illustrated here. After the automobile 5 has been secured on the platform 4 the cables 6 are shortened and the platform 4 is caused to pivot on its fulcrum and assume the inclined position indicated at B in Fig. 1. The platform 4 moves pivotally because of the particular cable arrangement described wherein the lifting force resulting from shortening of the cables tends to lift the end of the platform where the sheaves 9 are located before they lift the end where the attachments 7 are provided. As the platform 4 pivots the lugs 16 are moved through an arc and they enter the notches 14a and once the lugs enter the notches they act to positively prevent vertical movement of the end of the platform adjacent to the brackets 11. The lugs 16 thus act to hold the studs 13 in the sockets 12 and thus to connect the end of the platform 4 with the wall of the freight car without limiting the pivotal movement thereof. When the decking platform is in the position illustrated at B link members 18 have one end secured to the ceiling at 19 and their other ends secured to the platform as at 20 to relieve the cables 6.

When the automobile has been removed from the platform 4 and it is desired to move the latter to the position shown in dotted lines at C in Fig. 1 the cables 6 are shortened to cause the platform to pivot as above described. After sufficient pivotal movement in this manner the arcuate movement of the lug 16 causes it to pass entirely through the notch 14a, at which time the studs 13 may move vertically from the sockets 12. Socket members 17 are provided in alignment with the sockets 12 and in close proximity to the ceiling 3 to receive the studs 13 when the platform is elevated in this manner.

Although a specific embodiment of the present invention has been illustrated and described it will be understood that various changes may be made within the scope of the appended claims without departing from the spirit of the invention, and such changes are contemplated.

Reference is made to the copending application for patent of Lawson H. Cooper, Serial No. 718,923, filed April 4, 1934, which includes a description of and claims relating to means for vertically guiding one end of the decking device in a transportation vehicle and for pivotally connecting the same thereto at a point spaced from the floor.

Reference is made to the copending application of William J. Nightingale, Serial No. 66,373, filed February 29, 1936, which includes a description of and claims relating to a particular form of vertical guiding means for the decking device and means for pivotally attaching the same thereto.

What I claim is:—

1. The combination with a transporting vehicle having a wall, a platform adapted to receive an automobile, means for elevating said platform, and a pivotal connection between the end of said platform and said wall, a member on said platform engageable with said pivotal connection to lock the end of the platform therein, said connection adapted to automatically release said member upon a predetermined amount of pivotal movement of said platform whereby said elevating means causes vertical movement of the released end of said platform.

2. The combination with a transporting vehicle having a wall, a platform adapted to receive an automobile, means for applying lifting pressure against said platform, and means for securing one end of said platform to said wall whereby said platform pivots around said means and moves to an inclined position as a result of said lifting pressure, said means including a pair of cooperating parts adapted to retain said end of the platform therein for a portion of its pivotal movement but being adapted to automatically release said platform upon a predetermined inclination whereby said lifting pressure removes the said end of said platform vertically from said securing means.

3. In a device of the character described, a stationary socket member, a platform adapted to support an automobile having a part received in said socket member, mechanism for pivoting said platform about said socket member to an inclined position, and interlocking means for securing said part in said socket member for a portion of its pivotal movement, said means adapted to move to unlocked position upon predetermined inclination of said platform whereby said part is released for movement from said socket member.

4. In a device of the character described, a stationary socket member, a platform adapted to support an automobile, means on said platform received in said socket, and means for applying lifting pressure to said platform to cause the latter to pivot with said socket as its fulcrum from a loading position to an elevating supporting position, and automatically releasable means for retaining said first named means in said socket during a predetermined amount of pivotal movement of said platform from said loading position to said elevated supported position.

5. In an automobile decking device, a platform adapted to support an automobile, a cable for each side of the platform having one end attached to an end of said platform, cable receiving means secured to an overhead supporting structure above the said end of said platform, cable receiving means attached to the other end of said platform, and a cable shortening element attached to the overhead supporting structure above said last named cable receiving means, said cables being trained over and under said cable receiving means respectively and having their other ends attached to said cable shortening element.

6. In an automobile decking device, a platform adapted to support an automobile, a cable for each side of the platform having one end attached to an end of said platform, cable receiving means secured to an overhead supporting structure above the said end of said platform, cable receiving means attached to the other end of said platform, a cable shortening element attached to the overhead supporting structure above said last named cable receiving means, said cables being trained over and under said cable receiving means respectively and having their other ends attached to said cable shortening element, and means for holding one end of said platform against vertical upward movement but allowing the platform to swing thereabout as it is raised by the shortening movement of the cables, said means automatically releasing said pivotally held end of the platform after a predetermined amount of pivotal movement thereof.

7. The combination with a transporting vehicle having a vertically extending wall and a ceiling, of a platform adapted to support an automobile, a pivotal connection between one end of said platform and said wall, a pair of cable systems on opposite sides of the platform each including a cable having one end attached to the said pivotally connected end of said platform, a sheave for each cable system secured to said ceiling above said end of said platform, a sheave for each cable system secured to the other end of said platform, and a cable shortening element secured to said ceiling adjacent to the said other end of said platform, the cable of each system being trained over and under said ceiling and platform sheaves respectively and having its other end secured to said cable shortening element.

8. The combination with a transporting vehicle having a vertically extending wall and a ceiling, of a platform adapted to support an automobile, a pivotal connection between one end of said platform and said wall, said connection being automatically released by a predetermined amount of pivotal movement of said platform to permit vertical movement of that end of the platform, a pair of cable systems on opposite sides of the platform each including a cable having one end attached to the said pivotally connected end of said platform, a sheave for each cable system secured to said ceiling above said end of said platform, a sheave for each cable system secured to the other end of said platform, and a cable shortening element secured to said ceiling adjacent to the said other end of said platform, the cable of each system being trained over and under said ceiling and platform sheaves respectively and having its other end secured to said cable shortening element.

9. The combination with a transporting vehicle having a floor, side walls, an end wall, and a ceiling, of a platform adapted to support an automobile, a pivotal connection between one end of the platform and said end wall, a cable system for each side of said platform each including a cable having one end attached to said end of the platform, a sheave for each cable system secured to said ceiling above said end of said platform, a sheave for each cable system secured to the platform adjacent the other end, the cables of each system being trained over and under said sheaves respectively and having their ends remote from said pivotal connection coupled with a cable operating mechanism.

10. In a transporting vehicle having a floor, a ceiling, side walls and an end wall, an automobile decking frame positioned longitudinally between said side walls and adjacent said end wall, elevating means in said vehicle for bodily raising said decking frame from a position adjacent the floor to a position adjacent the ceiling, means on said end wall intermediate the floor and the ceiling adapted to be connected to the adjacent end of said decking frame to restrain said adjacent end from upward movement, said means forming a pivot about which the decking frame can be swung, and a pair of rigid supporting members for said decking frame pivotally connected at one end to the ceiling and adapted to be connected at the other end thereof to opposite sides of the decking frame, said supporting members being of a length less than the distance separating said pivot on the end wall from the ceiling whereby when the decking frame is connected to said pivot and to said rigid supporting member it assumes an upwardly inclined position from its connection to the end wall.

11. An elevating mechanism for automobiles comprising, in combination, a load supporting bodily movable platform of a size to support an automobile thereon, an upright support, means for detachably securing one end of the platform to said upright support to restrain the end from upward movement but forming a pivotal support for said platform, a flexible elevating element on each side of the platform connected to the opposite ends of said platform and to a fixed support above said platform, a single control mechanism operative to shorten said flexible elements, said flexible elements coupled to said platform and to said fixed support in such a manner that when they are shortened by said control mechanism, they cause the end of the platform adjacent said upright support to rise when the same is free for vertical movement and to swing the platform about said end as a fulcrum when the end is pivotally secured to said support.

12. The combination with a transporting vehicle having a floor, a ceiling and wall supporting means therefor, of a platform adapted to support an automobile, means on said wall supporting means spaced above the floor forming a pivotal connecting means for the platform, and means on one end of the platform for disconnectedly coupling the platform to said pivotal connecting means and thus form a pivotal connection between the wall supporting means and the platform at a point above the floor about which the platform may be swung, a cable system for raising either or both ends of the platform including a cable on each side of the platform, each of the cables being attached to the platform adjacent its opposite ends and to the ceiling intermediate its connection to the platform, a cable shortening mechanism, one end of each of said cables being wound about said mechanism so that upon operation of the mechanism the cables are either shortened or lengthened simultaneously.

13. The invention as characterized in claim 12 wherein a pair of rigid members are pivotally attached to the vehicle adjacent the top of the vehicle over the free end section of the platform, and means for removably connecting the free ends of the rigid members to the opposite sides of the platform when the latter assumes an upwardly inclined position in the vehicle from its pivotal connection to the wall supporting means, whereby the load of an automobile on the platform is carried by the rigid arms and the connection to the wall supporting means.

14. In combination with a transporting vehicle having a floor, a ceiling, and side and end walls, an automobile decking frame positioned longitudinally within said vehicle between the side walls thereof, means on one of said end walls spaced from the floor of the vehicle for pivotally connecting one end of said decking frame thereto, and an elevating means for swinging said decking frame about said pivotal connection including a cable on each side of said frame each operatively connected to the frame adjacent its ends and to the ceiling above the frame intermediate its connections to the frame, and means for shortening said cables simultaneously to bodily swing the frame and an automobile loaded thereon about said pivotal connection so that the free end of the frame may be disposed on a level above its pivotally connected end.

15. In a transporting vehicle having a floor, side and end walls, and a ceiling, a load supporting platform extending longitudinally between said side walls of the vehicle, means for releasably pivotally attaching one end of said platform to an end wall of the vehicle at a place thereon spaced above the floor, and means for bodily raising said platform within the vehicle including the end which is capable of being attached to said end wall but when the latter is detached therefrom, said last means adapted when said platform is pivotally attached to said end wall to swing said platform about the connection as a fulcrum.

16. In combination with a transporting vehicle having a floor, a ceiling, and side and end walls, an automobile decking frame positioned longitudinally within said vehicle between the side walls thereof, a pair of cables one for each side of the frame operating in vertical planes substantially coincident with the sides of the frame, each cable operatively connected to the sides of the frame adjacent the opposite ends thereof and to a fixed support in the vehicle above the decking frame in such a way that upon shortening movement of the cable the whole frame may be bodily raised or one end thereof may be raised above the other end if the latter is held from upward movement, means on one end wall of said vehicle spaced from the floor thereof for releasably holding the adjacent end of said decking frame from vertical movement but forming a pivotal support about which the frame may swing, and cable shortening means for simultaneously shortening said cables and thereby bodily raising the frame in the vehicle when the end of the frame adjacent to said end wall is released therefrom or swinging the same about said pivotal holding means if the latter is acting to hold the end of the frame adjacent to said end wall from upward movement.

17. In a transporting vehicle having a floor, a ceiling, side walls and an end wall, an automobile decking frame positioned longitudinally between said side walls and adjacent said end wall, elevating means in said vehicle for bodily raising said decking frame above the floor, means on said end wall intermediate the floor and the ceiling forming a pivotal connection to which the adjacent end of said frame may be releasably pivotally connected, means for suspending the opposite end section of the frame from a fixed support in the vehicle thereabove, said last means adapted to support the end section of the frame to which it is attached upon a higher level than the pivotal connecting means on the end wall whereby when the frame is connected to said suspending means and to said pivotal connecting means it will assume a downwardly inclined position toward the end wall so that the greater portion of the load of an automobile carried by the frame is taken by the end wall of the vehicle.

18. The combination with a transporting conveyance having a wall, a platform adapted to receive and support an automobile, means for elevating said platform, means cooperatively arranged on said wall and on one end of said platform for holding said end of said platform against vertical movement but forming a pivotal support about which the platform can swing as it is raised by said elevating means, said last means automatically being disengaged after a predetermined amount of pivotal movement thereof.

19. In combination with a supporting structure having a floor and upright supporting means on the floor, a decking device adapted to receive and support an automobile thereon, means for releasably pivotally connecting one end of said decking device to said upright supporting means, a cable for each side of the device, means operatively connecting said cables to the decking device adjacent to the opposite ends thereof and to a fixed support on the structure above the decking device, a common cable winding means for said cable including a shaft extending transversely to the decking device about which said cables may be wound, said cables adapted upon rotation of said shaft in one direction to wind upon said shaft and simultaneously shorten their respective lengths and raise the entire decking device or swing the same about its pivotal connection to said upright supporting means depending upon whether the decking device has been released from said pivotal connection or is restrained from such movement by said pivotal connection.

WILLIAM J. NIGHTINGALE.